United States Patent
Cuzin et al.

(10) Patent No.: US 7,984,308 B2
(45) Date of Patent: Jul. 19, 2011

(54) METHOD AND DEVICE FOR STOPPING AN ELECTRICAL APPARATUS SUPPLIED BY A PLURALITY OF POWER SOURCES, APPARATUS EQUIPPED WITH ONE SUCH DEVICE, AND SYSTEM COMPRISING ONE SUCH DEVICE

(75) Inventors: Rene Cuzin, Meylan (FR); Luc Descotils, Revel (FR); Dominique Lallement, Saint Egreve (FR)

(73) Assignee: MGE UPS Systems, Saint Ismier (FR)

( * ) Notice: Subject to any disclaimer, the term of this patent is extended or adjusted under 35 U.S.C. 154(b) by 967 days.

(21) Appl. No.: 11/797,453

(22) Filed: May 3, 2007

(65) Prior Publication Data
US 2007/0268639 A1 Nov. 22, 2007

(30) Foreign Application Priority Data
May 18, 2006 (FR) ...................... 06 04436

(51) Int. Cl.
*G06F 1/00* (2006.01)
*G06F 11/30* (2006.01)
(52) U.S. Cl. ........ 713/300; 713/340; 320/106; 320/107; 307/11
(58) Field of Classification Search .................. 713/300, 713/340; 320/106, 107; 307/11
See application file for complete search history.

(56) References Cited

U.S. PATENT DOCUMENTS

| | | | | |
|---|---|---|---|---|
| 5,915,118 A | | 6/1999 | Migita | 395/750.01 |
| 5,963,010 A | * | 10/1999 | Hayashi et al. | 320/106 |
| 6,078,871 A | * | 6/2000 | Anderson | 702/63 |
| 6,079,026 A | * | 6/2000 | Berglund et al. | 713/340 |
| 6,091,246 A | * | 7/2000 | Saigo et al. | 324/434 |
| 7,330,990 B2 | * | 2/2008 | Sato et al. | 713/340 |
| 2003/0160514 A1 | * | 8/2003 | Rajagopalan | 307/65 |
| 2005/0034003 A1 | | 2/2005 | Sato et al. | 713/340 |
| 2005/0086544 A1 | * | 4/2005 | Egan et al. | 713/300 |
| 2005/0162129 A1 | * | 7/2005 | Mutabdzija et al. | 320/116 |
| 2006/0206741 A1 | * | 9/2006 | Allison et al. | 713/340 |

OTHER PUBLICATIONS

Davis, A., "Distributed UPS Systems Increase Network Reliability and Flexibility," vol. 12, No. 10, Aug. 1, 1992. pp. 108-111.

* cited by examiner

*Primary Examiner* — Vincent T Tran
(74) *Attorney, Agent, or Firm* — Steptoe & Johnson LLP

(57) ABSTRACT

A method for shutdown of an electrical apparatus supplied by a plurality of electric power sources equipped with a management module, comprising:
(a) identification of each source,
(b) reading of data from the management module,
(c) determination of the global autonomy of the plurality of sources with respect to said apparatus, and
(d) shutdown of the apparatus when at least one shutdown criterion of the apparatus has been achieved.

A shutdown device comprising communication means communicating with the management modules and comprising implementation of the previously described shutdown method.

An electrical apparatus comprising control means for shutdown of said apparatus and the previously described shutdown device coupled with said control means.

A system comprising a plurality of electric power sources and at least the previously described electrical apparatus.

12 Claims, 4 Drawing Sheets

METHOD AND DEVICE FOR STOPPING AN ELECTRICAL APPARATUS SUPPLIED BY A PLURALITY OF POWER SOURCES, APPARATUS EQUIPPED WITH ONE SUCH DEVICE, AND SYSTEM COMPRISING ONE SUCH DEVICE

BACKGROUND OF THE INVENTION

The invention relates to a method for shutdown of an electrical apparatus supplied by a plurality of electric power sources, each source being equipped with a management module.

The invention also relates to a shutdown device for an electrical apparatus supplied by a plurality of electric power sources, each source being equipped with a management module, said shutdown device comprising communication means communicating with the management modules of said sources.

The invention further relates to an electrical apparatus designed to be supplied by a plurality of electric power sources, comprising control means enabling shutdown of said apparatus.

The invention also relates to a system comprising a plurality of electric power sources, and at least one electrical apparatus supplied by said sources.

STATE OF THE ART

To preserve the functional integrity of certain electrical apparatuses, stopping these apparatuses often requires implementation of a shutdown procedure during which the electric power supply of these apparatuses must not be disturbed. This is the case for example of computer hardware such as computers or servers for which the processed data have to be previously stored.

In prior art systems comprising an electrical apparatus of this type supplied by one or two electric power sources, it is known to use a shutdown device integrated in the apparatus or coupled to the latter. The shutdown device of the apparatus generally comprises an interface with a management module of each power source supplying said apparatus. Thus, according to the operating autonomy of each of these sources, the shutdown device of the apparatus can command shutdown of said apparatus sufficiently early before the electric power sources have been exhausted.

Known shutdown devices are generally configured to communicate with each power source, i.e. essentially to read data concerning the electric power supplied by each of the sources feeding said apparatus. Adding or removing a power source generally requires reconfiguration of the shutdown device. This reconfiguration is often fastidious, in particular when the system is complex and comprises a plurality of apparatuses supplied by a plurality of electric power sources.

SUMMARY OF THE INVENTION

The object of the invention is to remedy the shortcomings of shutdown methods and devices of the prior art.

The invention relates to a method for stopping an electrical apparatus supplied by a plurality of electric power sources, each source being equipped with a management module, said method comprising the following steps:
(a) identification of each source supplying power to the electrical apparatus,
(b) reading of data from the management module of each source,
(c) determination of the global autonomy of the plurality of power sources with respect to said apparatus, and
(d) shutdown of the apparatus when at least one shutdown criterion of the apparatus has been achieved.

Preferably, identification of the management module of at least one source is performed by means of a distributor arranged between said source and the electrical apparatus.

Preferably, the data from the management module of each source contain at least one of the following data items:
the autonomy,
the charging rate, and
information relating to alarms.

According to a particular embodiment of the invention, the global autonomy of the plurality of sources is limited by a redundancy level required for said apparatus.

According to a preferred embodiment of the invention, determination of the global autonomy comprises determination of a shutdown time of each source with respect to shutdown of the source that was previously shut down, the global autonomy of the plurality of sources being equal to the sum of said times. Preferably, determination of the shutdown time of each source is performed by simulation of several shutdown steps, each shutdown step corresponding to shutdown of a source in the chronological order of the shutdowns, the global autonomy of the plurality of sources being obtained by incrementing the shutdown time determined at each shutdown step. Preferably, determination of the shutdown time of each source comprises, for each shutdown step:
determination of the autonomy of each source that has not yet been shut down,
determination of the charging rate of each source that has not yet been shut down,
determination of a derating of the autonomy of each source that has not yet been shut down, said derating being a function of a variation of the charging rate,
correction of the autonomy of each source that has not yet been shut down by subtracting the derating,
selection of the source that has not yet been shut down having the shortest autonomy, and
incrementing the shutdown time of the selected source.

According to an embodiment of the invention, one shutdown criterion of the apparatus is that the global autonomy of the plurality of sources with respect to said apparatus is substantially equal to the shutdown time of said apparatus.

According to a particular embodiment, the shutdown criterion of the apparatus depends on the information relating to alarms of said sources.

Preferably, the method comprises an initialization step wherein an electric mains power supply failure message can be read.

The invention also relates to a shutdown device for an electrical apparatus supplied by a plurality of electric power sources, each source being equipped with a management module, said shutdown device comprising communication means communicating with the management modules of said sources, said device comprising implementation of the shutdown method described above, shutdown of said apparatus depending on the data from the management module of each source.

The invention further relates to an electrical apparatus designed to be supplied by a plurality of electric power sources comprising control means enabling said apparatus to be shut down, said apparatus comprising a previously described shutdown device coupled to said control means.

The invention finally relates to a system comprising a plurality of electric power sources and at least one electrical apparatus supplied by said sources, wherein the at least one electrical apparatus is in accordance with the one described above, each source being connected to said at least one electrical apparatus.

Preferably, in the system of the invention at least one source is connected to said electrical apparatus by means of a distributor.

BRIEF DESCRIPTION OF THE DRAWINGS

Other advantages and features will become more clearly apparent from the following description of particular embodiments of the invention, given as non-restrictive examples only, and represented in the accompanying figures.

DETAILED DESCRIPTION OF PREFERRED EMBODIMENTS

Figure 1:
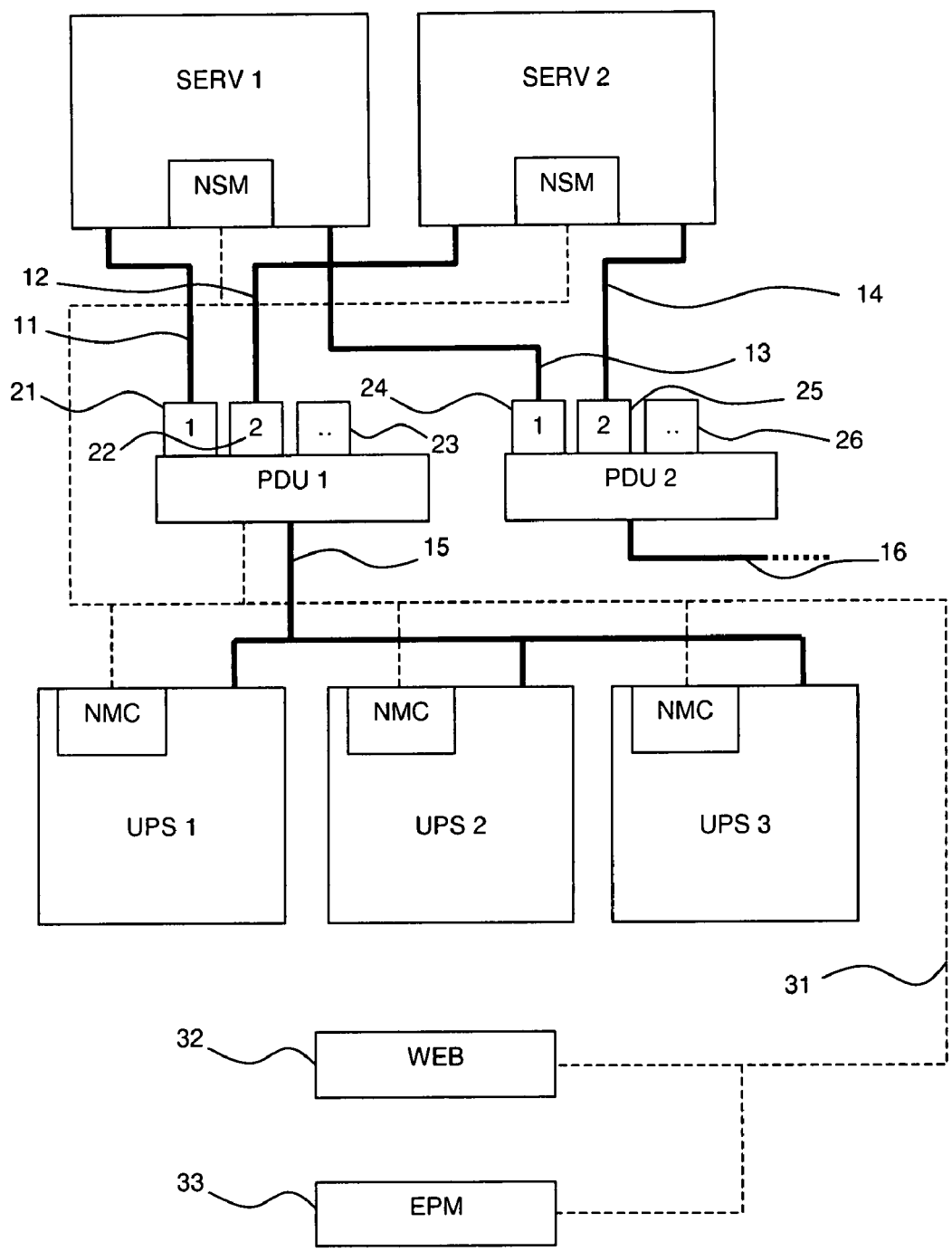
FIG. 1 schematically represents a system comprising two computer system servers supplied by a plurality of inverters by means of distributors.

The system represented in FIG. 1 comprises three electric power sources, i.e. inverters UPS1, UPS2 and UPS3, and two electric apparatuses, in this case computer system servers SERV1 and SERV2. The computer servers are electrically supplied by means of electric power conductors 11 to 16, via two distributors PDU1 and PDU2.

In the case represented in FIG. 1, the server SERV1 is supplied by the three inverters UPS1, UPS2 and UPS3 via the distributor PDU1 and the electric power conductors 11 and 15. The server SERV1 comprises a second electric power supply point connected to other electric power sources that are not represented, via the distributor PDU2 and the power conductors 13 and 16. These two power supply points can enable a redundancy level to be obtained in case of failure of the power sources connected to one or the other of these points. The distributors PDU1 and PDU2 comprise several channels 21 to 26 enabling the electric power to be distributed between the different servers. The channels 21 and 22 of the distributor PDU1 are respectively connected to the servers SERV1 and SERV2 via the power conductors 11 and 12. In the same way, the channels 24 and 25 of the distributor PDU2 are respectively connected to the servers SERV1 and SERV2 via the power conductors 13 and 14. The distributors can also comprise switching means enabling the electric power supply to be interrupted on one or more channels.

The equipment that constitutes the electric power sources, the electrical apparatuses and the distributors generally comprises processing means equipped with an interface with a data network. These processing means generally enable management of this equipment by monitoring different states and by implementing commands via this data network.

As far as the electric power sources are concerned, the latter generally comprise a management module. In the case of FIG. 1 where the sources are inverters, the management module NMC can also be called Network Management Card.

The management module NMC generally enables processing of data concerning the electric power supplied by the source and makes the data available via the network. The management module NMC can enable a mains power failure to be detected, source shutdown criteria to be examined, and delayed shutdown of said source to be commanded when these criteria are achieved. In parallel, the management module NMC can enable a mains power failure message and/or data concerning the electric power supply, for example the autonomy of the source, to be sent via the network, this message and/or data being accessible by the electrical apparatuses connected to the network.

As far as the electrical apparatuses are concerned, the latter generally comprise a shutdown device NSM. In the case of FIG. 1 where the electrical apparatuses are computer system servers, the shutdown device NSM can also be called a Network Shutdown Module. The shutdown device NSM generally enables management of shutdown of the electrical apparatus. The shutdown device NSM can also enable reading of data from the management module NMC of each source, for example the autonomy of said source. The device NSM can also enable management of shutdown of the electrical apparatus according to the data from the management module NMC of each source. The shutdown device NSM of an electrical apparatus can be integrated in the processing means of said apparatus. Alternatively, the shutdown device can be integrated in processing means of a source or of a distributor. The shutdown device NSM generally comes in the form of a software program.

As far as the distributors are concerned, the latter generally comprise processing means enabling management of the distributor and comprising an interface with the network. In the case of FIG. 1, the processing means of the distributors have not been specifically represented. One of the functionalities of the distributors can be reading of data from the management module NMC of the source connected on each channel of the distributor. Thus, in the case of FIG. 1, reading of data from the management module NMC of a source by the shutdown device NSM of a server is achieved by reading of the data from the distributor concerning the channel on which said server is connected. The distributors for their part comprise the data from the management module NMC of the source connected to said distributor.

The management modules NMC, the shutdown devices NSM and the processing means of the distributors of the system represented in FIG. 1 are interconnected by communication lines 31 of a communication network, for example of ethernet or USB type. A supervisor EPM also enables the data of all the processing means of this system to be monitored.

Figure 2:
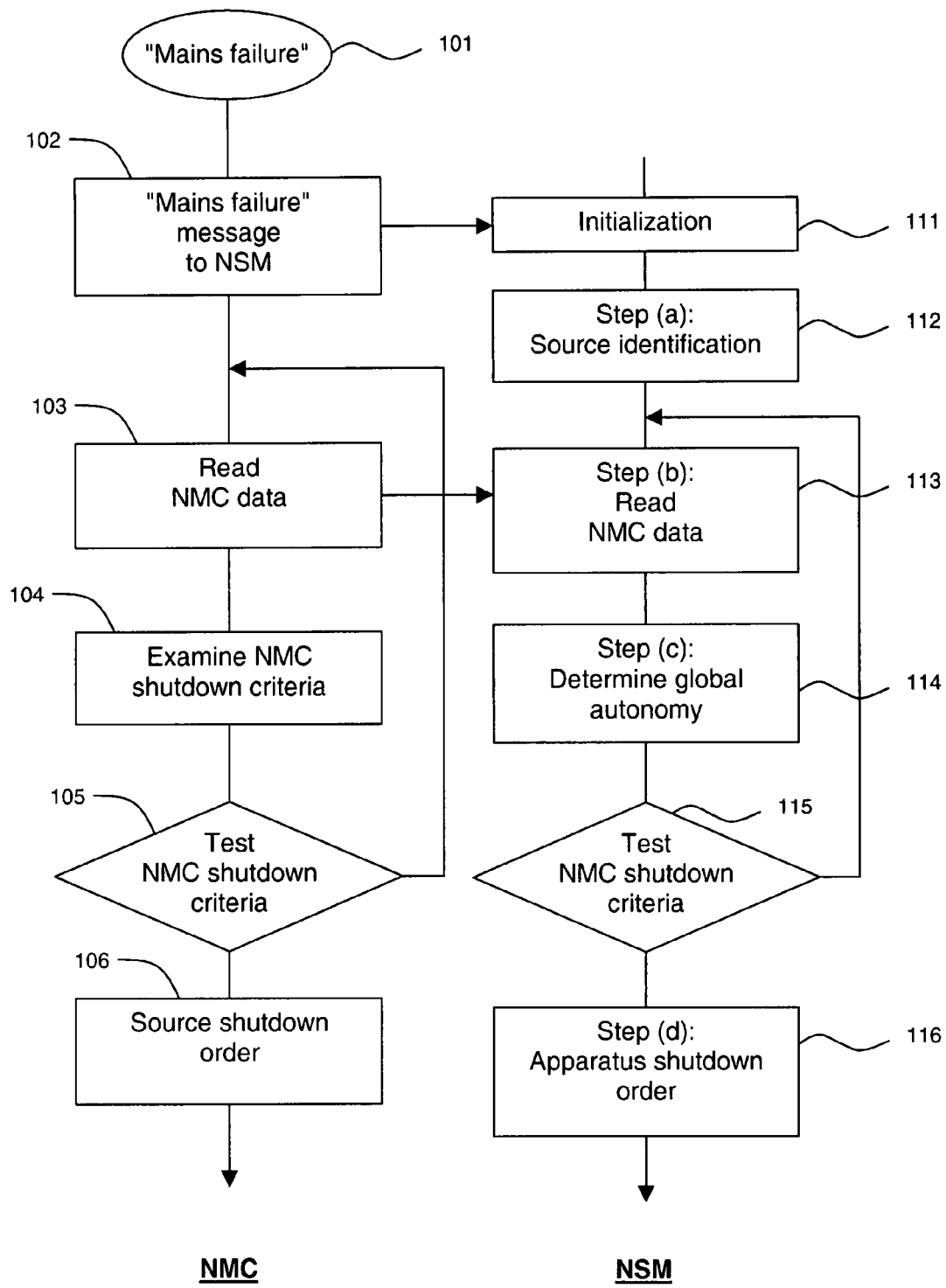
FIG. 2 represents two flowcharts, one representing the shutdown method according to the invention and the other representing the shutdown procedure of a source implemented by the management module of the latter.

The shutdown method implemented by the shutdown device of an apparatus, the shutdown method implemented by one of the electric power sources supplying said apparatus, and the functional interactions between these two methods are illustrated by the flowcharts represented in FIG. 2.

The source shutdown method implemented by the management module NMC of said source is illustrated, for example purposes, by the flowchart represented on the left of FIG. 2. The source shutdown method is initiated by a failure of the mains power supply 101. In the case where the source is an inverter, the mains power supply failure marks switching to an operating mode of the inverter on battery. As soon as a mains power supply failure is detected, a "mains failure" message is sent 102 over the network, for the attention of the electric apparatuses connected to said network.

Then the source management module NMC implements an iterative method comprising the following steps:

reading 103 of the data concerning the electric power supply of the source, hereafter called NMC data, examination 104 of shutdown criteria of the source, hereafter called NMC shutdown criteria, and testing 105 to determine whether the NMC shutdown criteria are achieved.

The iterative method is interrupted when the testing 105 enables it to be determined that the shutdown criteria of the source are achieved. In this case, a shutdown order 106 of the source is issued. This order can also be issued with a certain time delay.

An embodiment of the shutdown method implemented by the shutdown device NSM of an electrical apparatus is illustrated, for example purposes, by the flowchart represented on the right of FIG. 2. The steps of this method can advantageously be implemented at different time steps. The shutdown method implemented by the shutdown device NSM is initialized in an initialization step 111 by receipt of a "mains failure" message coming from the management module NMC of one of the sources.

According to one feature of the invention, the electrical apparatus shutdown method comprises an identification step 112 of the sources enabling all of the power sources electrically supplying said apparatus to be identified. This source identification is generally performed by means known to those skilled in the trade, according to the type of communication protocol and the type of network used. For example, identification can be performed on the basis of automatic identification of the IP addresses of the sources on the network, or by manual configuration of the addresses of each source on power-up. This systematic identification of the sources enables the shutdown device to adapt to any configuration change resulting in modification of a state of a power source for a given apparatus, such as for example the availability or unavailability of the source or operation in downgraded mode.

In the case of a system comprising distributors PDU between the power sources and the electrical apparatus, the identification step 112 of the sources can be performed by means of said distributor. In particular, this identification step 112 can be performed by reading of the data from the distributor corresponding to the channel of said distributor on which the apparatus is connected, this data comprising the data from the management module NMC of the source supplying the apparatus via said distributor channel.

When the electric power sources supplying said apparatus have been identified, the shutdown device NSM of the electrical apparatus implements an iterative method with a given time step.

According to another feature of the invention, this iterative method can comprise the following steps:

reading 113 of data from the management module NMC of each source, determination 114 of the global autonomy AUT of the plurality of sources with respect to said apparatus, and testing 115 of shutdown criteria of the apparatus.

This iterative method is interrupted when the testing 115 enables it to be determined that the shutdown criteria of the apparatus are achieved. In this case, a shutdown order 116 of the apparatus is issued. This order can also be issued with a certain time delay.

The data from the management module NMC of each electric power source, read in the step 113, can be any data concerning the electric power supply of said source. This data can for example be the autonomy DAPA of the source, the charging rate LL of the source and/or information relating to alarms. In the latter case, these alarms can have an impact on operation of the source with respect to the electrical apparatus, for example causing operation of the source in by-pass mode.

What is meant by charging rate LL of the source is the ratio between the portion of power consumed by all the electrical apparatuses connected to said source and the power available on output of said source.

In the case of a system comprising distributors PDU between the sources and the electrical apparatus, the step 113 of reading data from the management module NMC of each source can be performed by prior identification of the management module NMC by means of said distributors.

The global autonomy AUT of the plurality of sources with respect to said apparatus, which is determined in step 1114, corresponds to an operating time without a penalty on the charging rate.

The global autonomy AUT of the plurality of sources with respect to said apparatus can advantageously act as basis for one of the shutdown criteria of the apparatus testing whereof is performed in step 115. Thus, a shutdown criterion of the apparatus can be that the global autonomy AUT is substantially equal to the shutdown time of said apparatus.

The global autonomy AUT can also be limited by taking into account a required redundancy level for the electrical apparatus. Preserving the integrity of an apparatus may in fact require the use of more than one power source with a minimum power per source. Alternatively, the redundancy level as such may constitute one of the shutdown criteria of the apparatus. In the latter case, at least two shutdown criteria can therefore be used, the first being that the global autonomy of the plurality of sources is substantially equal to the shutdown time of said apparatus, and the second being that the redundancy level required by the apparatus be respected. Other shutdown criteria of the apparatus can be used, for example on the basis of information relating to alarms of the sources supplying said apparatus, these alarms being able for example to provide operating safety of the electrical apparatuses by indicating the presence of an overload or automatic switching to by-pass mode.

Figure 3:
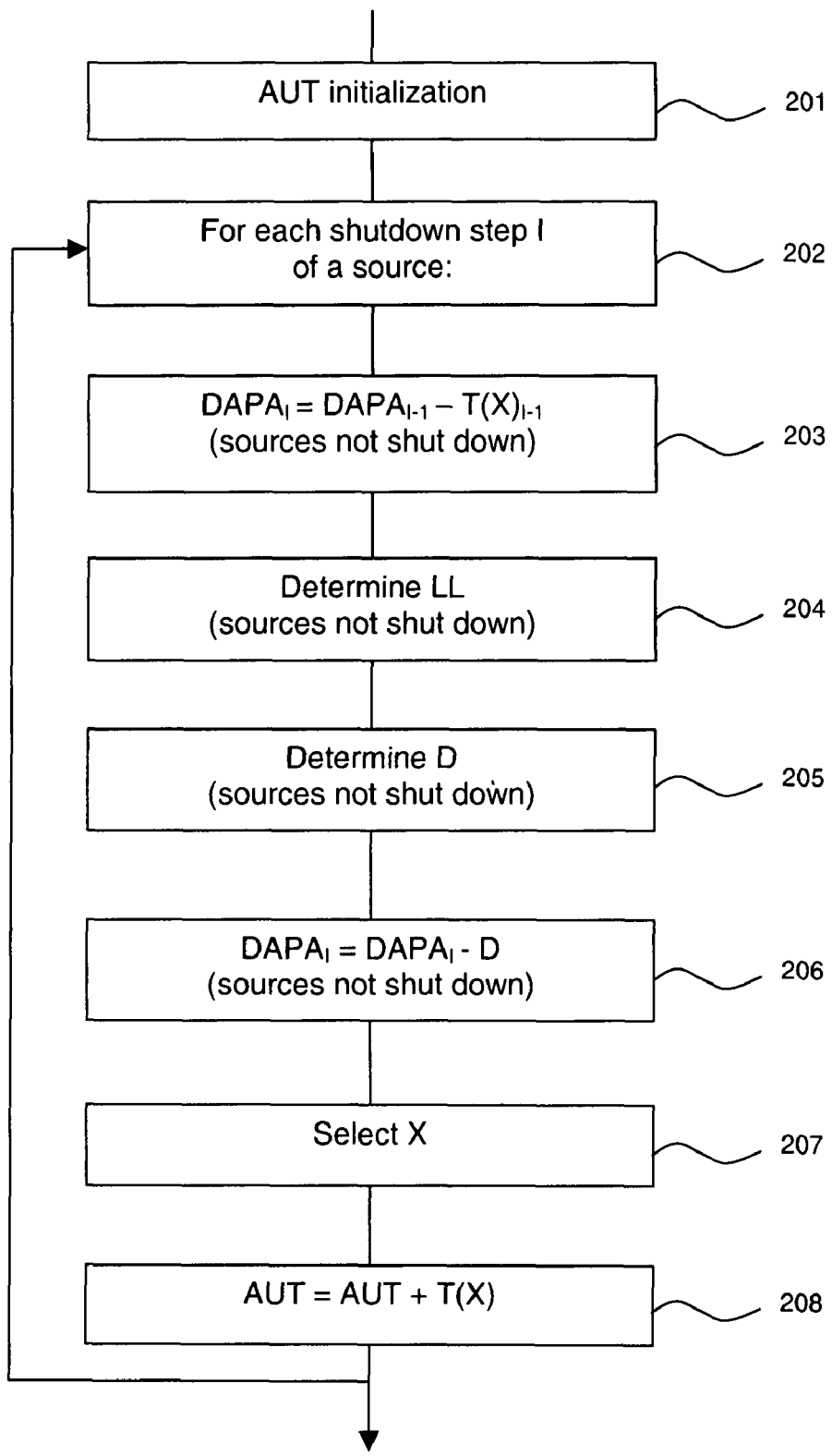
FIG. 3 represents, in more detailed manner, a part of the flowchart of the shutdown method according to an embodiment of the invention.

The step 114 of determining the global autonomy AUT of the plurality of sources with respect to said apparatus is set out in detail in a particular embodiment represented in FIG. 3.

In the embodiment of FIG. 2, this step 114 of determining the global autonomy AUT comprises determination of the shutdown time T(X) of each source X with respect to shutdown of the previously shut down source, the global autonomy AUT of the plurality of sources being equal to the sum of said times. Determination of the shutdown time T(X) of the source X shut down first is performed with respect to the time step considered of the iterative method of steps 113 to 115. This iterative method enables the next source shutdowns to be simulated and predicted.

In the embodiment of FIG. 3, determining the shutdown time T(X) of each source X is performed by a method 202 in several shutdown steps, each shutdown step corresponding to shutdown of a source in chronological order of the shutdowns, the global autonomy AUT of the plurality of sources being obtained by incrementing the shutdown time T(X) determined at each shutdown step.

In the embodiment of FIG. 3, each shutdown step of the method 202 for determining the shutdown time T(X) of each source X comprises:

determination 203 of the autonomy DAPA of each source that has not yet been shut down, determination 204 of the charging rate LL of each source that has not yet been shut down, determination 205 of a derating D of the autonomy of each source that has not yet been shut down, said derating being a function of a variation of the charging rate, correction 206 of the autonomy DAPA of each source that has not yet been shut down by subtracting the derating D, selection 207 of the source X that has not yet been shut down having the shortest autonomy, and incrementation 208 of the shutdown time T(X) of the selected source.

In the embodiment of FIG. 3, the method 202 in several shutdown steps for determining the shutdown time T(X) of each source X comprises an initialization step in which the value of a register dedicated to the global autonomy AUT is zero reset. The autonomy is computed by incrementing the shutdown time T(X) to the value of this register on each shutdown step.

The autonomy DAPA of each source not yet shut down at the first shutdown step corresponds to the autonomy of each source read at the step 113 of the method at the time step considered.

The derating D of the autonomy of a source X determined in the step 205 is a function of a variation of the charging rate on this source. This derating D generally corresponds to a reduction of the autonomy due to the increase of the charging rate on the source following shutdown of another source. This autonomy derating D is generally determined by an empirical formula.

EXAMPLES OF IMPLEMENTATION OF THE METHOD OF THE INVENTION

Figure 4:
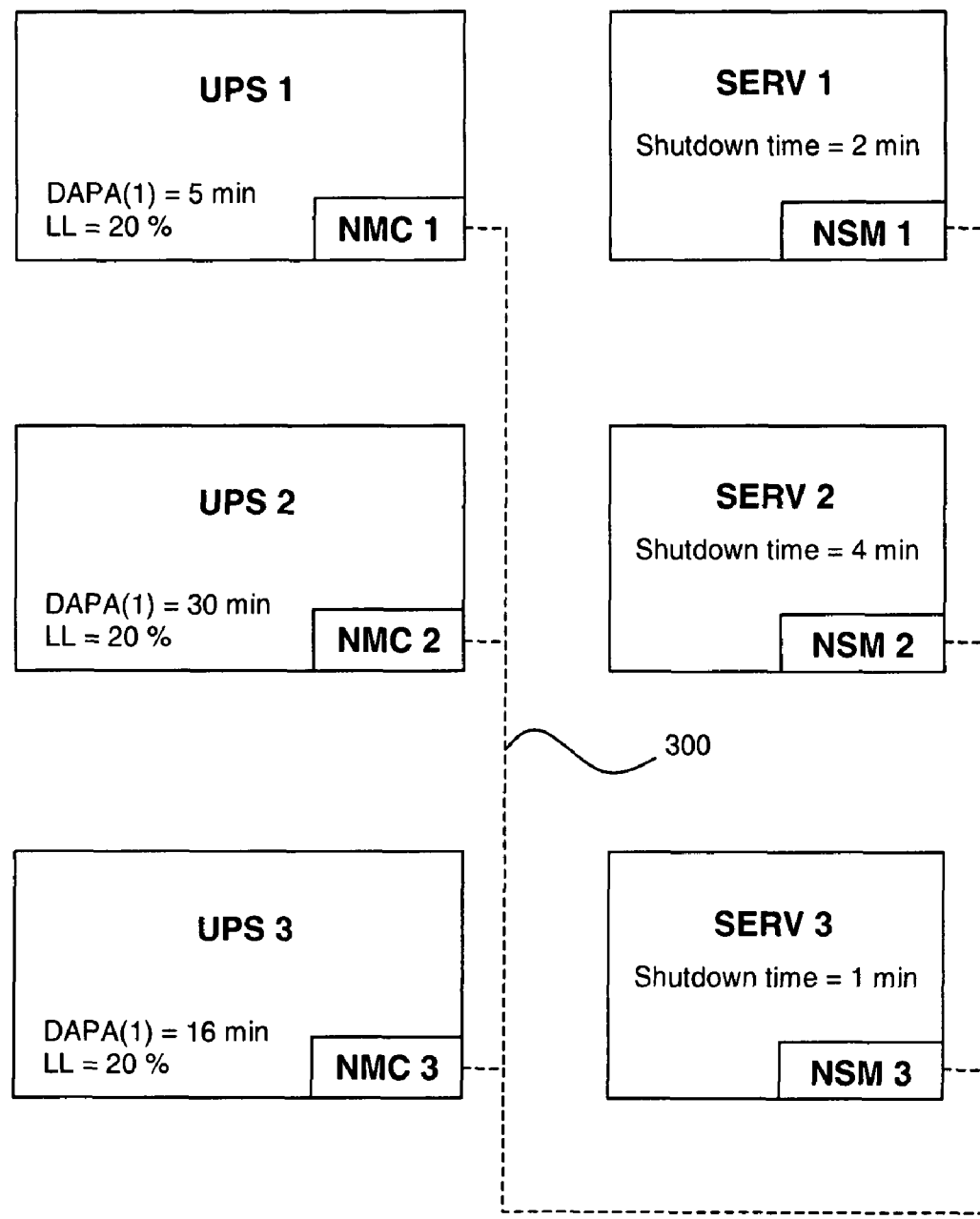
FIG. 4 represents, for example purposes, a simplified system comprising three computer system servers supplied by three inverters, and the data, at a given time, of the management module of each inverter and of the shutdown device of each server.

The first example was made on the basis of simulation of a simplified system comprising three computer system servers SERV1 to SERV3 supplied by three inverters UPS1 to UPS3. This simplified system is represented in FIG. 4 with the data from the management module of each inverter and from the shutdown device of each server. Each server is supplied by each of the three inverters. The power conductors between the inverters and the servers have not been represented for the sake of clarity. Only the network communication conductors between the management modules NMC1 to NMC3 and the shutdown devices NSM1 to NSM3 have been represented by the numerical reference 300.

The server SERV2 is equipped with a shutdown device NSM2 implementing the shutdown method of the invention according to the embodiment represented in FIGS. 2 and 3. As indicated in FIG. 4, the server SERV2 presents a shutdown time of four minutes. Any shutdown of this server during a time of less than four minutes is therefore liable to impair the functional integrity of said server. In this example, only the shutdown method implemented by NSM2 is illustrated. For the other servers SERV1 and SERV3 presenting a shutdown time respectively equal to two minutes and one minute, the shutdown method of their respective shutdown device can be essentially implemented in the same way.

The objective of the shutdown method implemented in the shutdown device of each server is therefore to perform shutdown of said server before the autonomy of the inverters electrically supplying this server runs out.

The shutdown method of the shutdown device NSM2 is initialized by sending of a failure message of the mains power supply of the part of the management module of one or the other of the power sources connected to the network. At this moment, each inverter supplies the servers from its battery, the latter presenting an autonomy which is a function of the charging rate.

After initialization, the three inverters supplying the server SERV2 are identified. The shutdown method can therefore implement a reading step of the data NMC of each source thus identified. In the case of this simplified example, the data from each source read by the shutdown device NSM2 correspond to the autonomy and to the charging rate. As indicated in FIG. 4, the method enables an autonomy respectively equal to 5, 30 and 16 minutes to be associated with the sources UPS1, UPS2 and UPS3. In the same way, the method enables a charging rate equal to 20%, i.e. one third of the power consumption of all the servers supplied by the sources UPS1, UPS2 and UPS3, to be associated with each source.

The global autonomy AUT of the inverters with respect to the server SERV2 is then determined. This determination by anticipation of the global autonomy AUT is performed by simulating several shutdown steps, each shutdown step corresponding to shutdown of an inverter in chronological order of the shutdowns. At each shutdown step, the shutdown time T(X) of each source (X), with respect to shutdown of the previously shut down source, is determined according to the algorithm of FIG. 3, the global autonomy AUT of the plurality of inverters with respect to the server SERV2 being obtained by incrementation of the shutdown time T(X) at each step.

Table 1 below presents the operations performed by the shutdown method implemented by the shutdown device NSM2, for each of the shutdown steps corresponding to successive shutdowns of the three inverters.

TABLE 1

| 1st shutdown step: | | |
|---|---|---|
| DAPA(1) = 5 min | DAPA(2) = 30 min | DAPA(3) = 16 min |
| LL(1) = 20% | LL(2) = 20% | LL(3) = 20% |
| D = 0 min | D = 0 min | D = 0 min |
| DAPA(1) = 5 min | DAPA(2) = 30 min | DAPA(3) = 16 min |
| Selection X = 1: Shutdown of UPS1; with T(1) = DAPA(1) = 5 min. | | |
| AUT = 5 min | | |
| 2nd shutdown step: | | |
| | DAPA(2) = 25 min | DAPA(3) = 11 min |
| | LL(2) = 30% | LL(3) = 30% |
| | D = 9 min | D = 4 min |
| | DAPA(2) = 16 min | DAPA(3) = 7 min |
| Selection X = 3: Shutdown of UPS3; with T(3) = DAPA(3) = 7 min. | | |
| AUT = 12 min | | |
| 3rd shutdown step: | | |
| | DAPA(2) = 9 min | |
| | LL(2) = 60% | |
| | D = 6 min | |
| | DAPA(2) = 3 min | |
| Selection X = 2: Shutdown of UPS2; with T(2) = DAPA(2) = 3 min. | | |
| AUT = 15 min | | |

The global autonomy AUT of the set of inverters with respect to the server SERV2 is therefore equal to 15 minutes. It should be noted that the shutdown programs of the other servers SERV1 and SERV3 would have reached the same result. One of the shutdown criteria of the server SERV2 can be that the global autonomy of the plurality of inverters with respect to said server is substantially equal to the shutdown time of said server, i.e. four minutes. At the time step corresponding to the data represented in FIG. 4, this shutdown criterion of the server SERV2 was not yet achieved and the test of step 115 is therefore negative. The iterative method of steps 113 to 115 was therefore reconducted until the global autonomy of the set of inverters with respect to the server SERV2 was equal to four minutes. When the global autonomy was equal to four minutes, it was still possible to shut the server SERV2 down properly, i.e. with a shutdown time of four minutes during which the power necessary for correct operation of the servers was still available.

In a second example, on the basis of the same simplified system represented in FIG. 4, it was considered that the initial charging rates were equal to 40%, instead of 20%, i.e. one third of the power consumption of all the servers supplied by the sources UPS1, UPS2 and UPS3. In this case, shutdown of the server SERV2 would take place earlier than in the previous example. Indeed, after shutdown of the inverter UPS3, the last inverter UPS2 would be on overload, i.e. with a charging rate of 120%, and would not be able to supply a sufficient charge to satisfy the whole set of servers. In this case, the server SERV2 would therefore have to be shut down four minutes before shutdown of the inverter UPS3.

The method of the invention applies particularly to computer systems for which the functional integrity of the equipment comprising the system hardware has to be preserved.

The method of the invention is particularly suitable for electrical apparatuses supplied by power sources presenting an operating mode on batteries, such as uninterruptible power supplies, for example inverters.

The invention claimed is:

1. A method for shutdown of an electrical apparatus supplied by a plurality of electric power sources, each source being equipped with a management module, the method comprising:
   (a) identification of each source supplying the electrical apparatus,
   (b) reading data from the management module of each source,
   (c) determination of a global autonomy of the plurality of power sources with respect to said apparatus, wherein determination of the global autonomy comprises determination of a shutdown time of each source with respect to shutdown of a previously shut down source, the global autonomy of the plurality of sources being equal to the sum of said times, determination of the shutdown time of each source being performed by simulation of several shutdown steps, each shutdown step corresponding to shutdown of a source in chronological order of the shutdowns, the global autonomy of the plurality of sources being obtained by incrementing the shutdown time determined at each shutdown step, and
   (d) shutdown of the apparatus when at least one shutdown criterion of the apparatus has been achieved, said shutdown criterion depending on a shutdown time of said apparatus.

2. The method according to claim 1, wherein identification of the data from the management module of at least one source is performed by a distributor arranged between said source and the electrical apparatus.

3. The method according to claim 1, wherein the data from the management module of each source comprise at least one of the following data:
   the autonomy,
   a charging rate, and
   information relating to alarms.

4. The method according to claim 1, wherein the global autonomy of the plurality of sources is limited by a redundancy level required for said apparatus.

5. The method according to claim 1, wherein determination of the shutdown time of each source comprises, for each shutdown step:
   determination of the autonomy of each source that has not yet been shut down,
   determination of the charging rate of each source that has not yet been shut down,
   determination of a derating of the autonomy of each source that has not yet been shut down, said derating being a function of a variation of the charging rate,
   correction of the autonomy of each source that has not yet been shut down by subtracting the derating,
   selection of the source that has not yet been shut down having shortest autonomy, and
   incrementation of the shutdown time of the selected source.

6. The method according to claim 1, wherein one shutdown criterion of the apparatus is that the global autonomy of the plurality of sources with respect to said apparatus is substantially equal to the shutdown time of said apparatus.

7. The method according to claim 1, wherein one shutdown criterion of the apparatus depends on information relating to alarms of said sources.

8. The method according to claim 1, comprising an initialization step wherein an electric mains power supply failure message is read.

9. A shutdown device for an electrical apparatus supplied by a plurality of electric power sources, each source being equipped with a management module, said shutdown device comprising communication means for communicating with the management modules of said sources, for implementation of a shutdown method according to claim 1, whereby shutdown of said apparatus depends on data from the management module of each source.

10. An electrical apparatus designed to be supplied by a plurality of electric power sources comprising control means for enabling said apparatus to be shut down, comprising a shutdown device according to claim 9 coupled to said control means.

11. A system comprising a plurality of electric power sources and at least one electrical apparatus according to claim 10 supplied by said sources, each source being connected to said at least one electrical apparatus.

12. A system according to claim 11, wherein at least one source is connected to said electrical apparatus by a distributor.

* * * * *